March 1, 1966  P. K. CHURCH  3,238,479
TRANSDUCER

Filed Jan. 8, 1963  5 Sheets-Sheet 1

INVENTOR.
PETER K. CHURCH
BY
Anderson, Spangler & Wymore
ATTORNEYS

March 1, 1966 P. K. CHURCH 3,238,479
TRANSDUCER
Filed Jan. 8, 1963 5 Sheets-Sheet 2

INVENTOR.
PETER K. CHURCH
BY
Anderson, Spangler & Wymore
ATTORNEYS

March 1, 1966  P. K. CHURCH  3,238,479
TRANSDUCER

Filed Jan. 8, 1963  5 Sheets-Sheet 4

INVENTOR.
PETER K. CHURCH
BY
Anderson, Spangler & Wymore
ATTORNEYS

March 1, 1966 P. K. CHURCH 3,238,479
TRANSDUCER
Filed Jan. 8, 1963 5 Sheets-Sheet 5

INVENTOR.
PETER K. CHURCH
BY
Anderson, Spangler & Wymore
ATTORNEYS 3,238,479
TRANSDUCER
Peter K. Church, Colorado Springs, Colo., assignor to Kaman Aircraft Corporation, Bloomfield, Conn., a corporation of Connecticut
Filed Jan. 8, 1963, Ser. No. 250,180
6 Claims. (Cl. 336—30)

This invention relates broadly to transducer devices and, more particularly, to transducers operating on an eddy current basis.

Prior art devices have generally relied upon the use of the variable reluctance or variable capacitance principles or have utilized strain gages to detect movement and convert same into measurable electrical signals proportional to such movement.

One type of transducer which has been previously used for the measurement of differential pressures utilizes the variable reluctance principle. A pressure sensitive diaphragm of magnetic material is positioned in spaced relation to a pole piece of magnetic material supporting a coil of wire. When the diaphragm is moved with relation to the pole piece, the change in inductance and reluctance in the coil induces electrical pulses into the coil. A pair of coils, with one positioned to either side of the magnetic diaphragm and connected into a bridge circuit will effect a measurable unbalance therein as a function of the movement of the diaphragm.

Prior art devices using magnetic circuits have serious drawbacks in that the permeability of the magnetic components is temperature sensitive; the frequency response of these devices are limited and the amplitude of the output signals available, using thin diaphragms, are necessarily low requiring further amplification for efficient utilization.

It is an important object of this invention, therefore, to provide improved transducer devices which avoid one or more of the disadvantages of the prior art arrangements and which provide very high output sensitivities.

It is a further object of this invention to provide an improved transducer which will provide a minimum output shift when subjected to a wide range of temperatures.

It is a further object of this invention to provide an improved transducer having superior high frequency response characteristics.

It is a further object of this invention to provide an improved transducer with continuous output resolution over its entire operating range.

It is a further object of this invention to provide an improved transducer adapted for direct connection to low impedance circuits.

It is a further object of this invention to provide an improved transducer arrangement useful over a wide range of pressures permitting extremely low pressure or standard pressure range units of smaller than normal configurations and having improved vibration, acceleration, shock, non-linearity, hysteresis and temperature specifications.

It is a further object of this invention to provide an improved transducer arrangement the output signal from which is substantially devoid of harmonic distortion.

A still further object of this invention is to provide an improved transducer which is economical and simple of construction and has but one moving part.

A further important object of this invention is to provide an improved transducer arrangement capable of having an essentially linear input-output relationship over a large range of input drive.

In accordance with the invention the improved transducer comprises at least one coil adapted for connection as an arm in an A.C. bridge circuit, a non-magnetic electrical conducting means movably positioned immediately adjacent said coil for movement toward and away from said coil, and means for applying a force for causing said non-magnetic means to move with respect to said coil and vary the effective impedance of said coil as a function of such movement.

For a better understanding of the present invention, together with other and further objects thereof, reference is had to the following description taken in connection with the accompanying drawings and its scope will be pointed out in the appended claims.

Figure 2:
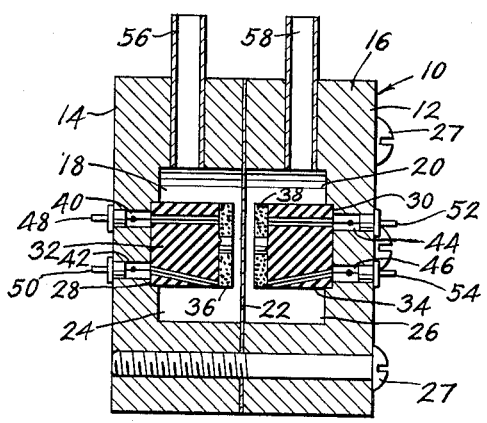
FIGURE 2 is a cross-sectional view taken at line 2—2 of FIGURE 1 showing the interior construction of a pressure sensitive transducer according to the invention.
Figure 1:
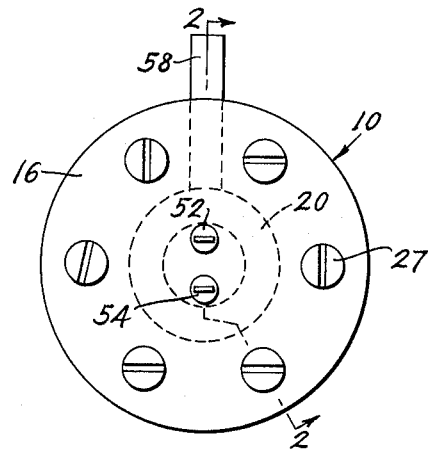
FIGURE 1 is a view in plan of one form of construction embodying the present invention.

Referring to FIGURES 1 and 2, there is shown an improved diaphragm type pressure transducer 10 that operates on what may be best termed a variable power loss, A.C. resistance or eddy current principle. This new concept allows the design and manufacture of transducers having material advantages over prior art devices. The transducer comprises a housing 12 made in two halves 14 and 16 each having a recess 18 and 20 therein. The housing halves have an electrical conducting, non-magnetic diaphragm 22 clamped therebetween, separating the space within the housing into two chambers 24 and 26 the whole being clamped together by screws 27 to effect pressure-tight joints between the several parts. The bottom of recesses 18 and 20 are provided with recesses 28 and 30 into which coil forms or cores 32 and 34 of non-magnetic, dielectric material are secured in a manner to provide a reasonable tight seal between the respective coil forms and the housing. Coil forms 32 and 34 are seen to support coils 36 and 38 thereon positioned in close proximity and to either side of diaphragm 22. The ends of coils 36 and 38 are connected to leads which may be formed integrally with the coil forms 32 and 34 or sealed therein in a suitable manner. The leads emerge from the bottom of each coil form into passageways 40, 42, 44 and 46 connecting the bottom of recesses 28 and 30 and the exterior of the housing. The outer ends of these passageways are sealed by an insulated electrical terminal 48, 50, 52 and 54 to provide a pressure-tight seal. The leads from the coil ends are connected to terminals 48, 50, 52 and 54 for connection to external electrical circuits.

Each half 14 and 16 of the housing is provided with pressure inlets 56 and 58 communicating respectively the inner chambers 24 and 26 to either side of diaphragm 22. When pressure is admitted to one of the pressure inlets, diaphragm 22 will be displaced toward an end surface of one coil while the distance between the other coil and the diaphragm will increase.

Figure 3:
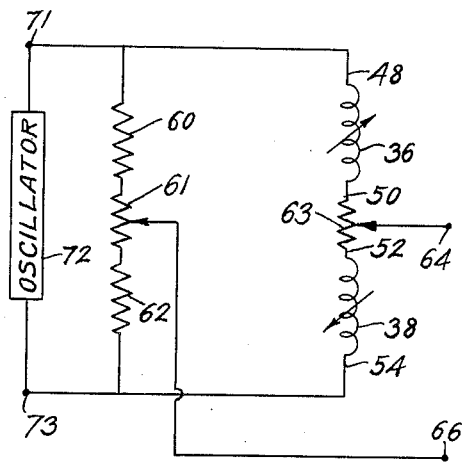
FIGURE 3 is a circuit arrangement including the transducer of the invention directly coupled for A.C. output.

When the coils of the transducer are connected as two arms of an A.C. bridge such as shown in FIGURE 3, the output of the bridge will vary with a change in applied pressure. With the resistive arms 60 and 62 being equal and coils 36 and 38 being of equal inductance and configuration, as well as being positioned equidistant from the diaphragm, the bridge output across terminals 64 and 66 will be zero. If a pressure is applied to one side of the diaphragm through a pressure inlet to displace the diaphragm toward one coil, eddy current losses will increase in said one coil and decrease in the other producing an unbalance in the four arm bridge and an output signal representative of unbalance, due to the diaphragm position, will appear across terminals 64 and 66 which can be sensed and measured.

The transducer of this invention may be constructed entirely of non-magnetic materials avoiding the normal permeability change problems with change in temperature and harmonic distortion generation found in prior art devices requiring the presence of magnetic elements. The coils 36 and 38, are air core coils wound with insulated copper wire, anodized aluminum wire and the like. Diaphragm 22 may be made of beryllium copper or Phosphor bronze and like non-magnetic materials for most applications whereas for other uses, a stainless steel diaphragm which has been plated with a thin layer of gold, silver, copper, aluminum, chromium, or other good electrical conductors in the area directly opposite the coil, generally identified as the "active area" of the diaphragm. The eddy current diaphragm must be of non-magnetic material and preferably, at least, the "active area" of the diaphragm is of a metal having good electrical conductivity. The greater the conductivity, the greater is the transducer output sensitivity.

The case 12 is preferably constructed of stainless steel or such other non-magnetic material having the requisite expansion rate and corrosion resistance characteristics.

The transducer design of FIGURES 1 and 2 may be provided with overload protection by extending the coil forms 32 and 34 to provide a stop for the diaphragm at a point of its travel just beyond the full range.

The transducer of this invention in using air core coils and avoiding the necessity of magnetic elements eliminates harmonic distortion being generated therein as is common to prior art devices. Further, the absence of magnetic elements allows much higher input frequencies to be utilized to advantage with higher frequency response being obtainable than with known devices.

The operation of the transducer of this invention is based upon the A.C. losses in the respective coils associated with eddy currents in the highly conductive element, which losses serve to unbalance an A.C. bridge including the coils, to produce an electrical output therefrom which is a function of the positioning of the element with respect to the coils. By proper selection of variables the output of the bridge can be made a linear function of the forces acting on the element.

The major categories of high frequency losses that must be considered for the coil-diaphragm configuration of FIGURES 1 and 2 are: the coil losses or power dissipated as heat in the coil windings; the power loss associated with the eddy currents produced in the metal diaphragm; the coil losses due to the proximity effect, the dielectric loss; and, the loss in coil inductance because of close proximity of the diaphragm.

In considering the coil losses involved in the transducer of this invention, for D.C. circuits, the resistance of a conductor may be defined as:

$$(1) \quad R = \rho \cdot \frac{l}{A}$$

Where:

$R$ = resistance in ohms
$\rho$ = resistivity in ohm-meters
$l$ = length of conductor in meters
$A$ = cross-sectional area of conductor in square meters However, as the frequency of the input current increases, the current distribution in the conductor becomes non-uniform. At high frequencies nearly all of the current will be concentrated very near the outer surface of the conductor. This phenomenon is commonly known as the "skin effect."

Because of the uneven current distribution across a conductor at high frequencies it will be necessary to consider the high frequency resistance as equal to the power dissipated divided by the square of the current, that is:

$$(2) \quad R = \rho \times I^{-2} \text{ or } I^2 R = P$$

Figure 6:
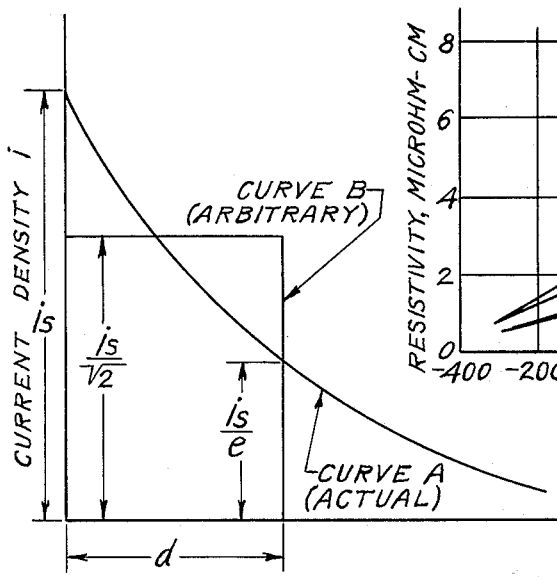
FIGURE 6 is a graphical representation of the current density as a function of depth below the surface of a conductor.

Current density at high frequencies will vary as a function of depth below the surface. As shown in FIGURE 6, the relationship of current density to depth of penetration is approximately exponential provided that the conductor is thick compared with the depth, $d$, at which the current density has decreased to $1/e$ of the surface value. The phase of the current varies directly as the depth, and at depth, $d$, lags the surface current by one radian.

It is more convenient to use an arbitrary current density with depth relationship rather than the actual, curve A, for theoretical consideration. Curve B assumes that the current density and phase are equal for a given depth below the conductor surface with no penetration below this depth. In this case, the height of the curve B must be $$\frac{2}{\sqrt{2}}$$

times the actual surface current density while the depth $d$, depicted by the curve, depends on the resistivity and permeability of the conductor as well as frequency. This arbitrary depth of penetration, $d$, is known as skin depth and may be expressed as:

$$(3) \quad d = \sqrt{\frac{\rho}{\pi \mu f}}$$

Where:

$d$ = skin depth, meters
$\rho$ = resistivity of conductor, ohm-meter
$\mu$ = permeability, henries per meter, and
$f$ = frequency, cycles per second Equations 1 and 3 can be used to obtain several important relationships of particular interest in the instant case. From Equation 3 it can be seen that the skin depth varies directly as the square root of the resistivity of the conductor and inversely as the square root of the frequency. Since the permeability of copper, silver or other non-magnetic conductors that would be used in the transducer is very nearly equal to 1, the permeability term can be neglected for all practical purposes.

By substituting the skin depth, Equation 3, multiplied by a constant K, for the cross-sectional area in Equation 1 gives the relation:

$$(4) \quad R = K\rho l \left(\frac{\pi f}{\rho}\right)^{1/2}$$

Equation 4 shows that the high frequency resistance is proportional to the square root of the resistivity of the conductor. It also shows that the resistance is proportional to the square root of the frequency.

Rearranging Equation 2 so that:

$$(5) \quad I = \left(\frac{\rho}{R}\right)^{1/2}$$

it follows that with a constant input power to the coil, the current will be inversely proportional to the square root of the resistance.

Since the high frequency resistance is proportional to the square of the frequency, then:

$$(6) \quad I \sim f^{-1/4}$$

Also, since the power loss may be expressed as:

$$(7) \quad P = \frac{E^2}{R}$$

then, assuming a constant input voltage, the following obtains:

$$(8) \quad P \sim \frac{1}{f^{1/2}}$$

Another significant relationship exists with voltage. In an A.C. circuit this is expressed as the product of current times the impedance. With air core coils of a few number of turns, as in the transducer of this invention, the D.C. resistance is quite small compared with reactance. Therefore, a close approximation may be made by assuming that:

$$(9) \quad E \simeq IX$$

Where: $E$ = voltage
$I$ = current
$X$ = impedance

The reactance, $X$, of any coil equals $2\pi f l$, so that the reactance is directly proportional to frequency. Since the current is inversely proportional to the one fourth power of the frequency, Equation 6, then:

$$(10) \quad E \sim f^{3/4}$$

Eddy currents will be produced in the metal diaphragm, positioned adjacent the end of the coil, due to the flux lines that pass into it from the A.C. excited transducer coil. These eddy currents result in $I^2R$ losses that must be supplied by the coil. These losses, therefore, have the effect of increasing the effective resistance of the coil. The general relationships between power loss, resistance, frequency, and diaphragm material resistivity previously mentioned are applicable.

Figure 7:
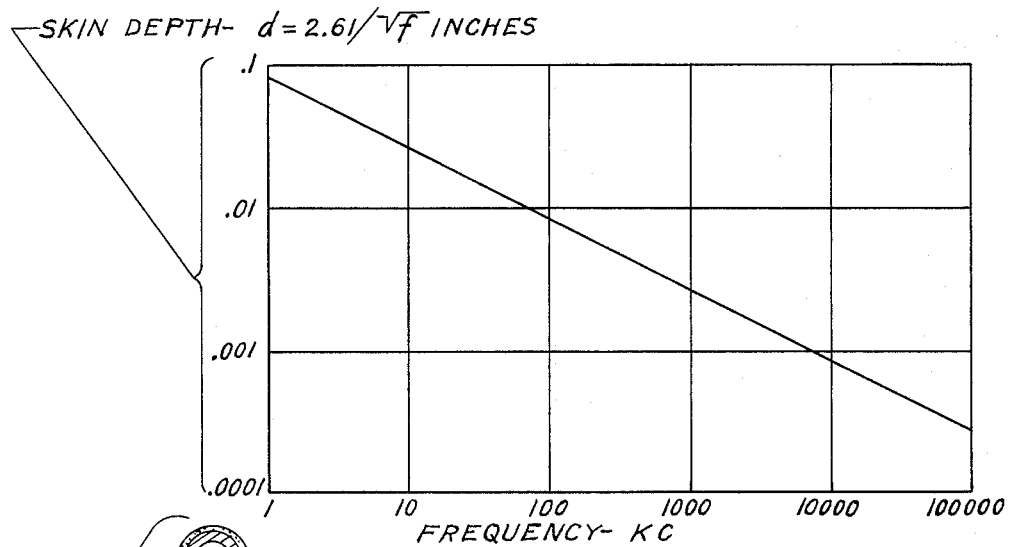
FIGURE 7 is a graphical representation of the depth of current penetration, in inches, as a function of frequency in an electrolytic copper conductor.

The depth of penetration of the eddy currents into the diaphragm likewise follows the relationship expressed in Equation 3. As the frequency of the current is raised, increasingly thinner diaphragms may be used and still provide maximum losses due to eddy currents. FIGURE 7 ilustrates the depth of penetration or skin depth as a function of frequency for copper. In this case $$\rho = 1.724 \times 10^{-8}$$

ohm-meters and $\mu = 1.26 \times 10^{-6}$ henries/meter for copper at 20° C. Substituting these values in Equation 3 gives:

$$d = 6.62 \cdot f^{1/2} \text{ cm. or } 2.61 \cdot f^{1/2} \text{ inches}$$

As can be seen from FIGURE 7, the skin depth in copper at 50 kc. is 0.0118 inch, at 500 kc. the effective penetration has dropped to 0.00375 inch while at 2 mc. the depth is 0.0018 inch.

Figure 8:
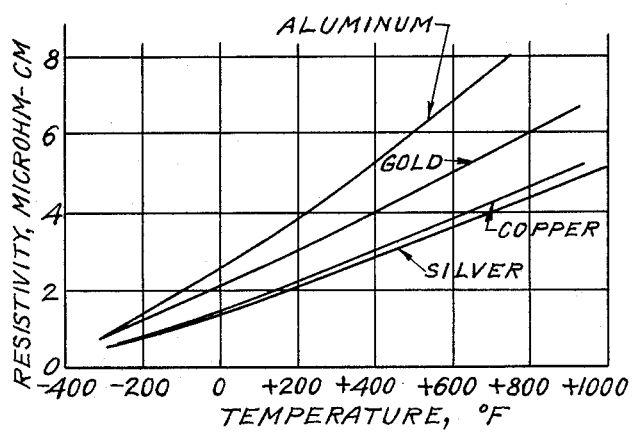
FIGURE 8 is a graphical representation of the resistivity change with temperature for silver, copper, gold and aluminum.

If the diaphragm material is varied from that of copper the skin depth will, of course, vary in relation to any resistivity and permeability change. Since the resistivity of a given material also changes with temperature, the skin depth will vary accordingly. FIGURE 8 shows a plot of this phenomenon for silver, copper, gold and aluminum over a temperature range of −400° F. to +1000° F. In general, the good conductors will give a more linear as well as a smaller resistivity change with temperature than will alloys or poor conductors.

The proximity effect is defined as the distortion of alternating current flow in one conductor due to that of neighboring conductors. In the transducer shown in FIGURES 1 and 2, both the coil and the coil-diaphragm combination will contribute to the proximity effect.

In considering the coil by itself, there will be a re-distribution of current in the windings because of the interaction of the magnetic flux produced by adjacent turns. This flux may be that caused by the exciting current as well as that produced by the eddy currents in the nearby windings.

Figure 9:
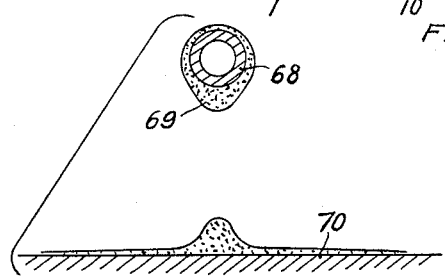
FIGURE 9 is a qualitative representation of the current redistribution as a result of the proximity of a current carrying conductors to a metal sheet.

When a flat metal plate or diaphragm is brought near to the coil there will also be a re-distribution of current in the coil windings and the current density will be crowded on the metal sheet. This re-distribution effect has been shown in a qualitative manner and diagrammatically in FIGURE 9 for a single conductor where the conductor is represented by reference numeral 68 and the conducting sheet as 70. The current distribution 69 about conductor 68 and on sheet 70 is distorted into the space between the sheet and conductor.

Because current is now concentrated in certain parts of the conductor rather than uniformly distributed, it can be seen that the power loss or effective coil resistance will be greater than if the diaphragm or adjacent coil windings are not present.

The current re-distribution becomes more pronounced as the spacing between the conductor and plate is made smaller as well as when the coil windings are tightly wound.

With a flat, closely wound multi-turn coil, placed with its end surface parallel to the diaphragm surface, the current density will be quite uniform directly under the active coil surface. The current density will taper off quite abruptly, however, where the active surface of the coil ends providing the gap between the coil and diaphragm is kept small. In the transducer of this invention, only the "active area" of the diaphragm directly opposite the coil contributes towards varying the coil losses and consequently the transducer output signal as the diaphragm is moved.

The distributed capacitance in the coil will introduce some loss in the solid dielectrics used in the coil form or core and wire insulation. Bringing the diaphragm close to the coil tends to increase the distributed capacitance and further increases the dielectric loss.

The dielectric loss may be represented by an equivalent series resistance:

(11) $$R_D = \frac{F\rho}{2\pi f C}$$

Where: $R_D$ = equivalent series resistance
$F\rho$ = power factor of distributed capacity
$f$ = frequency
$C$ = distributed capacitance.

When considering total coil loss, this equivalent series resistance representing dielectric loss must be added to the total coil resistance. Equation 11 shows that $R_D$ is inversely proportional to the frequency.

An inductance loss is also sustained by bringing the diaphragm in close proximity to the active surface of the coil producing a reduction in the effective inductance of the coil. This is a result of the metallic sheet acting as a partial non-magnetic shield which interferes with the total flux produced by the coil. Reducing the number of flux lines has the effect of increasing the magnetic reluctance of the coil.

Figure 4:
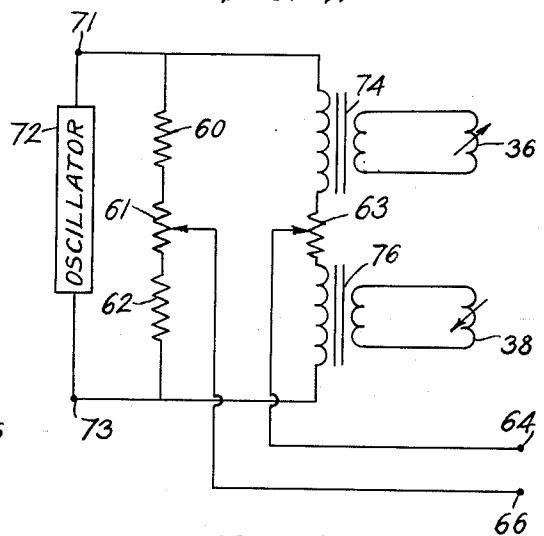
FIGURE 4 is another circuit arrangement including the transducer of the invention, transformer coupled for A.C. output.
Figure 5:
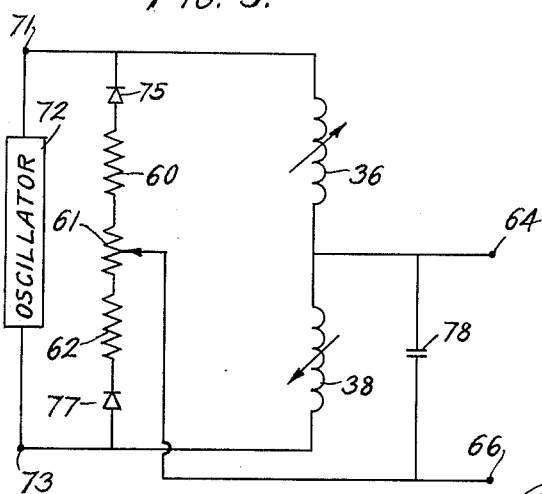
FIGURE 5 is a circuit arrangement including the transducer of the invention modified to provide a D.C. output.

The variable eddy current transducer of this invention normally would be used as one or more of the active arms of an electrical bridge circuit. The circuits of FIGURES 3, 4 and 5 illustrate several versions of A.C. bridge circuits for obtaining D.C. and A.C. outputs. The circuit of FIGURE 3 illustrates a form of A.C. bridge with transducer coils 36 and 38 forming the active arms and resistive elements 60 and 62 forming the passive arms. Resistive elements 60 and 62 may be variable to provide for an electrical balance of the transducer. In certain cases it may be desirable to substitute for one of the two transducer coils an inactive arm or fixed coil diaphragm arrangement. A suitable resistance, capacitance inductance or suitable combination of same may also be substituted for one of the coils as only a single coil is required to produce an output signal from such a circuit. An oscillator 72 is connected across the bridge input terminals 71 and 73 and when arm elements 36, 38, 60 and 62 are balanced, the output appearing between terminals 64 and 66 will be zero. When the losses in coils 36 and 38 are varied by movement of diaphragm 22 closer to one and away from the other, this unbalance produces a voltage across terminals 64 and 66 as an output signal.

FIGURE 4 illustrates a modified bridge circuit where the transducer arms are connected to the secondary windings of saturable transformers 74 and 76 and present variable impedance loads thereto. The primary windings are connected as two active arms of the bridge. This circuit has advantages where it is desired to change the impedance levels between that of the transducer and the output of the bridge across terminals 64 and 66. Where air core coils are used in the transducer, the impedance may be on the order of 10-50 ohms, which is suitable for long cable runs. Connecting such a transducer in the circuit of FIGURE 4 would require much less driving power from oscillator 72 than required for the circuit of FIGURE 3.

The circuit shown in FIGURE 5 illustrates a further circuit modification of a bridge for obtaining a D.C. bridge output. The output across terminals 64 and 66 is polarity sensitive and will reverse polarity depending on which direction the transducer is unbalanced. The diodes 75 and 77 provide for sampling of the bridge unbalance every one-half cycle of the input supply for presentation at output terminals 64 and 66 as a D.C. voltage proportional to transducer unbalance. The capacitor 78 serves to filter the half wave D.C. output and may be replaced by a more sophisticated filter for improved high frequency response.

Null balancing in the A.C. bridge circuits of FIGURES 3 and 4 is accomplished by means of variable resistors 61 and 63 with 61 being used to balance out the resistive component and 63 being used to obtain a reactive balance between the two transducer arms. With the D.C. output circuit of FIGURE 5 only one resistor 61 is needed to obtain a zero D.C. output.

Tests were conducted to verify the theoretical considerations. It was found that the thickness of the diaphragm required for maximum output at a given frequency was considerably less than that predictable solely from the skin depth equations.

The effect of different diaphragm materials is illustrated by the data in Table I which shows the relative output voltages obtained from the transducer of FIGURES 1 and 2 with different materials used for the diaphragm. In each case, the diaphragm is at least three "skin depths" in thickness at 1 megacycle input frequency. The tests were all made with a .005" total change in the diaphragm-to-coil air gap, from a .006" gap to a .001" gap, and the coils consisted of 80 turns of #34 single enamel wire to form a coil .040" thick and ⅜" in diameter.

Table I

| Material | Alloy | Thickness, inches | Output, $E_0$ | Resistivity, ohm-m.×10³ |
|---|---|---|---|---|
| Silver | 99.9% | .009 | +.160 | 1.59 |
| Copper | 99.9% | .007 | +.158 | 1.71 |
| Aluminum | 99.0% | .0095 | +.158 | 2.92 |
| Brass | {33% Cu / 68% Zn} | .042 | +.138 | 6.4 |
| Beryllium-copper | #25 | .010 | +.138 | 4.82 |
| Phosphor bronze | Type A | .007 | +.135 | 9.6 |
| Copper-silver | {35% Ag / 65% Cu} | .010 | +.126 | |
| Titanium | 99.0% | .033 | +.090 | 55.0 |
| Stainless steel | #321 | .026 | +.088 | 72.0 |
| Invar | {36% Ni / 64% Fr} | .013 | −.022 | 81.0 |
| Monel | | .031 | −.017 | 53.2 |

The input voltage for the results shown in Table I was 3 volts. As shown by the table, the greatest output is obtained with the material having the greatest conductivity and lowest resistivity. Such materials will introduce the greatest $I^2R$ losses into the circuit.

As previously pointed out, for maximum output of a transducer of this invention, the diaphragm material must have a permeability not significantly greater than about one, i.e., be non-magnetic. Two materials, Invar and Monel, having approximate permeabilities of 5000 and 2000 respectively are included in the table for comparison. The output with these materials is shown as a reverse polarity, to indicate a slight over-all gain being produced in the circuit by these materials, rather than a low, as the air gap is reduced which is due to increasing the coil inductance.

The foregoing skin depth considerations indicate that at a given frequency a diaphragm of less than a given thickness will result in less than maximum transducer output. Also, a diaphragm thicker than the given thickness will produce no greater output. Further, the minimum diaphragm thickness for maximum output should decrease as the input frequency increases.

Tests were carried out to verify these findings. Two open ended coil forms were wound with 120 turns of #36 single enamel wire. The circuit was that of FIGURE 3 with resistances 60 and 62 each being 25 ohms. The input signal to the bridge from oscillator 72 was maintained at one volt.

The output voltage $E_0$ for a given diaphragm thickness and frequency was determined by first placing a .005" Mylar spacer between each coil and its diaphragm and subtracting this output voltage from the output voltage obtained when the spacer is removed from between one coil and its diaphragm where the coil is in direct contact therewith. The diaphragms comprised one or more .00113" thick electrolytic sheets of copper.

Figure 10:
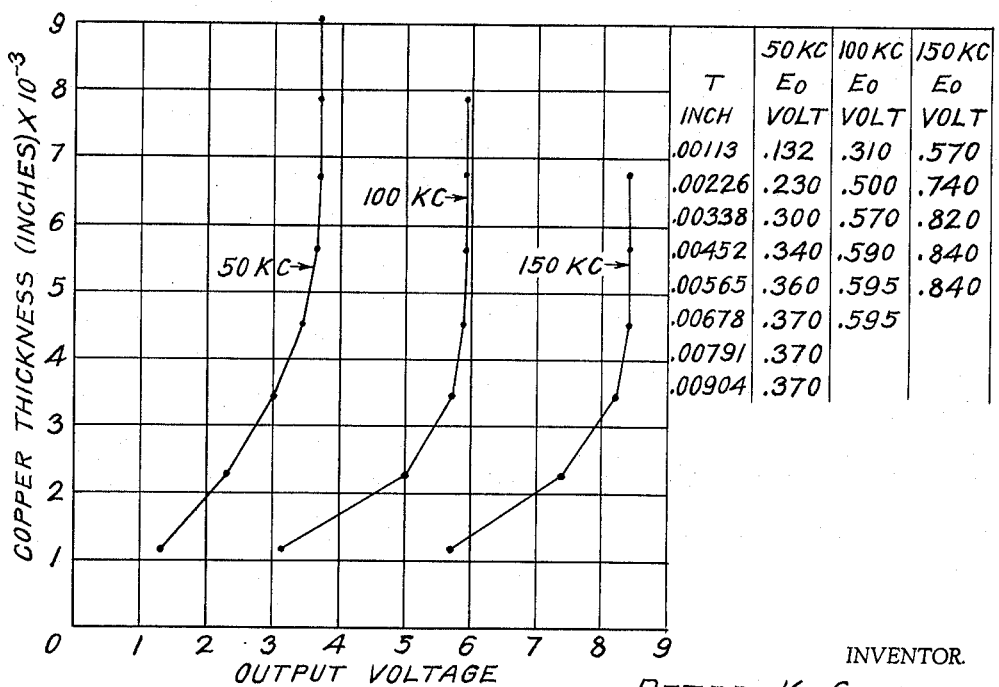
FIGURE 10 is a graphical representation of the relative transducer output voltage versus diaphragm thickness at 50 kc., 100 kc. and 150 kc. input frequencies.

FIGURE 10 illustrates graphically the minimum diaphragm thickness to produce maximum output voltage at various input frequencies. It was found that the diaphragms could be considerably thinner than that calculated to achieve maximum output at a particular frequency. It will also be noted that the output is greater at the higher frequencies.

A series of tests were conducted to determine the effect on output voltage, output impedance and output power with changes in the number of turns on the coils at various input frequencies. The A.C. bridge circuit of FIGURE 3 was used for the tests. The coil diameters for all tests was maintained at ⅜″ and in all but the 50-turn coil, the coil thickness was constant. As the number of turns are varied, the wire size was selected to fill the coil form.

The non-transducer arms 60 and 62 of FIGURE 3 for these tests consisted of coils having the same number of turns and size as the coils under test. A copper slug was attached to these coils so that they would simulate the same impedance as the transducer arms making it possible to assume that the impedance of all four bridge arms remain essentially equal as the frequency of the input signal to the bridge from oscillator 72 is varied, even though actual impedance values differ with different input frequency.

The two coils simulating the active transducer arms were positioned on a flat copper diaphragm with a .005″ Mylar spacer positioned between the coil and the diaphragm. In Tables II through VI, the output signal is presented as the voltage difference, $E_0$, between the output voltage from the bridge with the spacers in position and that obtained when one spacer is removed positioning the coil directly on the diaphragm.

The output impedance $Z_0$ in the tables also represents the impedance of each bridge arm.

Table II

Coil—40 turns #32 SE insulated wire; ⅜″ dia. x .040″ thick

| Freq., mc. | Input voltage, $E_I$ | Output voltage, $E_0$ | Output impedance, $Z_0$ in ohms | Power output, $P_0$ in $\mu\omega$ | Power, mv./v. |
|---|---|---|---|---|---|
| 0.5 | 1 | .0375 | 8 | 17.6 | 38 |
| 1.0 | 1 | .041 | 12 | 14.0 | 41 |
| 1.5 | 1 | .045 | 17 | 11.9 | 45 |
| 2.0 | 1 | .046 | 22 | 9.6 | 46 |
| 2.5 | 1 | .0625 | 30 | 13.0 | 63 |
| 3.0 | 1 | .054 | 33 | 8.8 | 54 |

Table III

Coil—80 turns #34 SE; ⅜″ dia. x .040″ thick

| Freq., mc. | Input voltage, $E_I$ | Output voltage, $E_0$ | Output impedance, $Z_0$ in ohms | Power output, $P_0$ in $\mu\omega$ | Power, mv./v. |
|---|---|---|---|---|---|
| .250 | 1 | .024 | 10 | 5.76 | 24 |
| .500 | 1 | .028 | 22 | 3.56 | 28 |
| 1 | 1 | .041 | 47 | 3.56 | 41 |
| 1.5 | 1 | .050 | 66 | 3.8 | 50 |
| 2 | 1 | .055 | 100 | 3.02 | 55 |
| 2.5 | 1 | .056 | 122 | 2.57 | 56 |
| 3 | 1 | .056 | 140 | 2.24 | 56 |

Table IV

Coil—120 turns; #36 SE; ⅜″ dia. x .040″ thick

| Freq., mc. | Input voltage, $E_I$ | Output voltage, $E_0$ | Output impedance, $Z_0$ in ohms | Power output, $P_0$ in $\mu\omega$ | Power, mv./v. |
|---|---|---|---|---|---|
| .250 | 1 | .045 | 20 | 10.1 | 45 |
| .500 | 1 | .050 | 56 | 4.47 | 50 |
| 1 | 1 | .060 | 100 | 3.6 | 60 |
| 1.5 | 1 | .066 | 170 | 2.56 | 66 |
| 2 | 1 | ---- | ---- | ---- | ---- |
| 2.5 | 1 | .060 | 300 | 1.2 | 60 |
| 3 | 1 | .060 | 400 | .9 | 60 |

Table V

Coil—160 turn #38 SE; ⅜″ dia. x .040″ thick

| Freq., mc. | Input voltage, $E_I$ | Output voltage, $E_0$ | Output impedance, $Z_0$ in ohms | Power output, $P_0$ in $\mu\omega$ | Power, mv./v. |
|---|---|---|---|---|---|
| .050 | 1 | .032 | 13 | 7.9 | 32 |
| .100 | 1 | .038 | 22 | 6.55 | 38 |
| .150 | 1 | .038 | 30 | 4.8 | 38 |
| .200 | 1 | .042 | 39 | 4.5 | 42 |
| .250 | 1 | .044 | 47 | 4.13 | 44 |
| .500 | 1 | .048 | 100 | 2.3 | 48 |
| 1 | 1 | .052 | 200 | 1.35 | 52 |
| 1.5 | 1 | .054 | 300 | .97 | 54 |
| 2 | 1 | .055 | 500 | .605 | 55 |
| 2.5 | 1 | .055 | 650 | .465 | 55 |
| 3 | 1 | .230 | 1,500 | 3.51 | 230 |
| 3.5 | 1 | .138 | 4,000 | −.478 | 138 |

Table VI

Coil—50 turn #38 SE; ⅜″ dia. x .025″ thick

| Freq., mc. | Input voltage, $E_I$ | Output voltage, $E_0$ | Output impedance, $Z_0$ in ohms | Power output, $P_0$ in $\mu\omega$ | Power, mv./v. |
|---|---|---|---|---|---|
| .250 | 1 | .054 | 12 | 24 | 54 |
| .500 | 1 | .057 | 22 | 14.7 | 57 |
| 1 | 1 | .066 | 47 | 9.25 | 66 |
| 1.5 | 1 | .070 | 66 | 7.4 | 70 |
| 2 | 1 | .078 | 95 | 6.5 | 78 |

Figure 11:
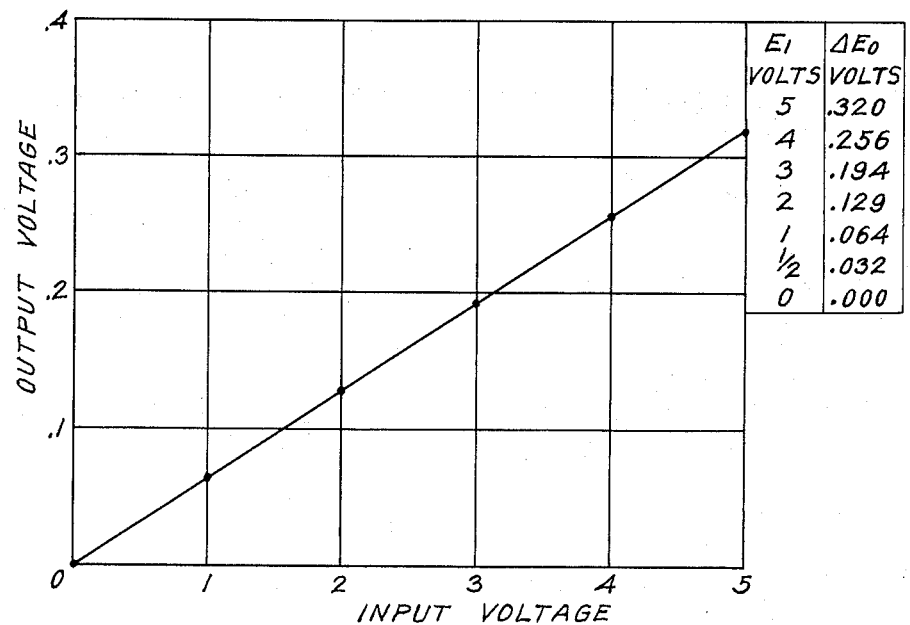
FIGURE 11 is a graphical representation of the transducer output voltage versus input voltage.

The relationship of input voltage $E_I$ to output voltage $E_0$ is linear over extremely wide ranges of input voltage as shown graphically in FIGURE 11. Driving the coils with sufficient power to produce considerable heating fails to materially alter this linear relationship.

The stresses on a flat circular diaphragm clamped around its periphery and devoid of edge tension may be considered as a linear function, if the diameter thereof is very large compared with its thickness or with very small amounts of total deflection. In practice, however, the diaphragm will always travel an increasingly smaller distance as each increment of pressure is applied. A plot of the output voltage of a transducer where the diaphragm is moved in equal increments reveals that the total output voltage for each increment of movement increases slightly as the diaphragm is moved closer to the coil. By selecting the amount of diaphragm travel, active diaphragm area, diaphragm thickness and diaphragm-to-coil air gap, a substantially linear output voltage to input pressure relationship can be obtained.

Figure 12:
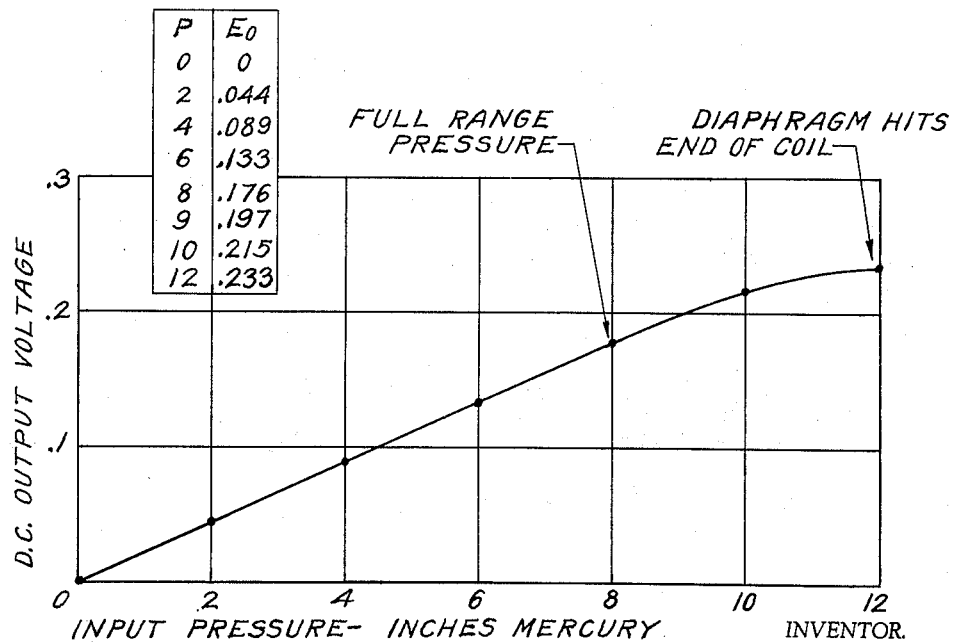
FIGURE 12 is a graphical representation of the transducer output voltage versus pressure.

FIGURE 12 illustrates the plot of transducer output versus pressure in a transducer according to the present invention wherein the variables were held in correct relationship to achieve a linearity deviation of not more than ¼% over the usable pressure range. In a linear transducer, the diaphragm will usually have traveled between 75% and 95% of the total possible gap between the rest position and the surface of the coil, depending on the pressure range. FIGURE 12 also shows the effect on output as the diaphragm approaches and seats against the coil limiting any further increase in output. Nominal diaphragm movements lie between a total of about .003″ to about .006″ for linear transducers in the 1 to 10,000 p.s.i. range when the active diaphragm diameter is between about ⅜″ and about ¾″.

The temperature effects on the transducer of this invention are next considered. Tests were run using a hot plate to heat the diaphragm to a temperature of 600° F. A one coil transducer serving as one arm of the bridge circuit of FIGURE 3 was used. The other coil and resistors 60 and 62 were at room temperature, i.e., about 70° F. This arrangement assured that no equal and opposite compensating effect resulted from other points of the circuit. The test circuit was operated with input frequencies of from about 250 kc. to about 1.5 mc. with a sufficient input signal to assure a sizable output with a diaphragm movement of about five mils.

The difference in output signals from the transducer were compared where the temperature of the diaphragm was varied from about 70° F. to about 600° F. Care was taken to maintain the spacing between the diaphragm and the coil uniform at the different temperatures. The results of these tests for a single coil as a bridge arm is shown in Table VII below:

*Table VII*

| Frequency in mc. | 160T #38 Se wire $\Delta E_0$, volts | 50T #38 Se wire $\Delta E_0$, volts |
|---|---|---|
| .25 | .000 | .000 |
| .50 | .000 | .000 |
| .75 | .000 | .000 |
| 1.0 | .000 | .000 |
| 1.5 | .000 | .000 |

In each case the diaphragm was of .00675 inch Phosphor bronze. The input voltage to the 160 turn coil was 8 volts and to the 50 turn coil 3 volts.

Further tests showed that other diaphragm materials could be utilized with equally satisfactory results provided the material is a good conductor, such as silver, copper, aluminum, Phosphor bronze, beryllium copper or brass and is also non-magnetic.

The output voltage shift is substantially zero where the wire size in the coil is kept relatively small. As the wire size of the coils is increased, greater temperature sensitivity may be expected. Thus, the wire size should be kept relatively small for best temperature characteristics. The reasons are not completely understood but use can be made of this to advantage where minimum zero shift with temperature is required. Where a two coil transducer is used forming two arms of the bridge, the wire size of the coils is of less significance to achieve a minimum zero shift and sensitivity change with temperature change. This is possibly due to the compensating effect of one coil on the other.

It is to be further noted that the thickness of the diaphragm plays an important part in minimizing temperature sensitivity in the transducer. It is found that the output shift with temperature change is minimized when the diaphragm thickness approaches or exceeds the skin depth for the particular input frequency. Since the skin depth is a function of the resistivity of the diaphragm material and since the resistance of the diaphragm material increases with increasing temperature, the eddy currents penetrate into the diaphragm further at higher temperatures to compensate for the increase in resistance of the diaphragm. The diaphragm for best results should provide sufficient thickness to accommodate the increased penetration, however, it must be remembered that it was experimentally determined that the actual or effective skin depth penetration is less than that as calculated.

As previously stated, the diaphragm will be deflected an increasingly smaller distance as each additional increment of pressure is applied at the same temperature. The amount of deflection with each increment of pressure is a function of the thermo-elastic properties of a particular diaphragm material. As the temperature is increased, the thermo-elastic coefficient will increase such that the same increment of pressure increase will result in an increased deflection of the diaphragm.

In certain instances, it may be desirable to use a diaphragm of laminated construction having a highly conductive metal as the outer or current conducting layer while having a backing layer of a poorer conductor but one having a more favorable spring-rate relationship with change in temperature. Such a diaphragm would include a good conductor such as copper, silver and the like attached to a backing of stainless steel or other similar non-magnetic material having a suitable thermo-elastic coefficient with change in temperature.

The remaining consideration is the linear coefficient of expansion of the gage parts and the diaphragm. Proper compensation for these is accomplished readily for the selection of the material for the transduced parts so as to achieve the proper differential expansion rates. The case 12 is preferably a stainless steel or other non-magnetic alloy.

Figure 13:
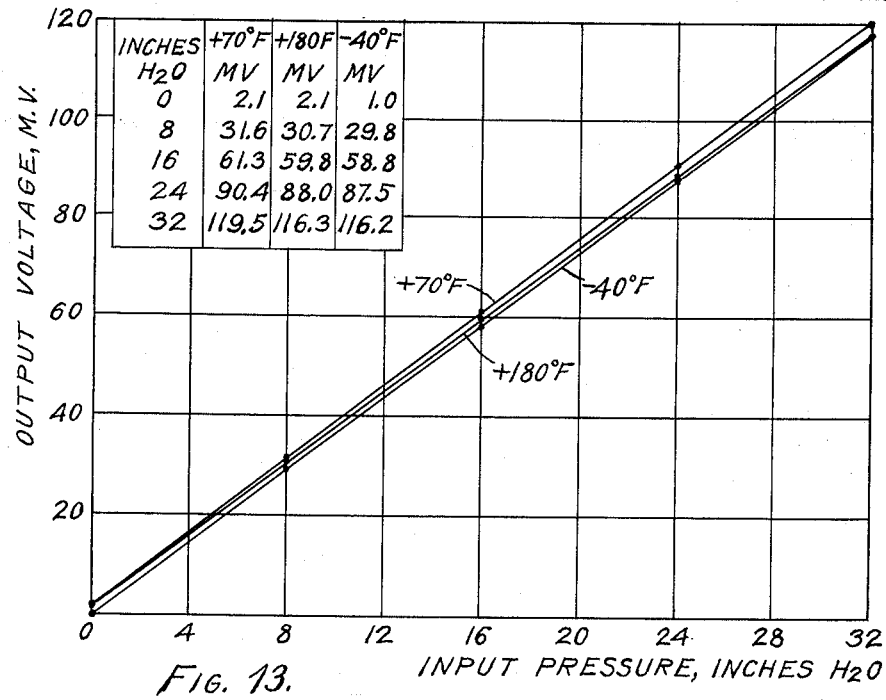
FIGURE 13 is a graphical representation of the transducer output voltage versus pressure at different temperatures; and, FIGURES 14 through 17 illustrate other embodiments of the instant invention.

FIGURE 13 is a graphical representation of the output from a two coil transducer according to the present invention plotted as output voltage versus pressure at different temperature levels. It is seen that the resolution of the transducer is continuous and the diaphragm responds uniformly to the application of pressure. The deviation of output versus pressure at the different temperatures is negligible and substantially constant over the range of pressure applied.

The transducers according to the invention have been subjected to temperatures of from about —80° F. to about 600° F. without producing significant shift in output signal.

Although the frequencies of the input signals to the transducer may be as low as 10 kc. and produce usable output signals, frequencies greater than about 50 kc. are more practical. The lower the input frequencies, the thicker the diaphragm must be to accommodate the necessary skin depth penetration for maximum output. The range of about 250 kc. to about 2 mc. is considered to be optimum for practical considerations. With input frequencies within this range, the diaphragm may be as little as .001–.002 inch in thickness.

Input frequencies in the 1 mc. region permit very fast response time. Even with the D.C. circuit of FIGURE 5, including a filter capable of reducing the output ripple to less than 1%, a frequency response of 200 kc. is readily attainable.

The limiting factor will normally be the resonant frequency of the diaphragm. These, even for low pressure range transducer arrangements, are quite high. A 0.1 p.s.i. transducer constructed according to the present invention using a .003" thick stainless diaphragm having a diameter of ¾" has a natural resonant frequency of about 3 kc. A 50 p.s.i. transducer having a ⅜" stainless diaphragm, .004" in thickness, has a natural resonant frequency in excess of about 10.0 kc. and higher pressure transducer arrangement has resonant frequencies proportionately higher.

The transducer of this invention operating on the variable eddy current principle inherently provides a low output impedance. Typical impedance values for air core transducer arms range from about 10 to about 300 ohms depending on the input frequency and the number of turns on the coils.

Sizable output signals are provided by these transducer arrangements. Typical dual coil transducers with an output impedance in the range of from about 50–200 ohms provide signals of about 40–100 millivolts per volt of input signal.

Linearity of output signal with pressure change is most easily accomplished with minimum total movement of the diaphragm and with the present invention the lower output can be offset by a higher input signal. For example, transducers having an output of 10 to 20 millivolt per volt input may have a non-linearity of not more than about ±.1%, while transducers having an output of 100 millivolts per volt input may have greater non-linearity, on the order of about .25% to about 1.0%.

The transducers according to the present invention can be constructed as a single coil flush diaphragm or with dual coils for use in missile environments including test stand and in flight instrumentation where rapid and extreme temperature variations are encountered; nuclear reactor instrumentation where intense gamma and neutron radiation is present with wide temperature variation;

hypersonic wind tunnel model testing where very low pressure and very small size are imperative; industrial draft controls where extreme long term stability and insensitivity to vibration is important and blast and shock wave instrumentation.

It will be appreciated that the present invention is intended to encompass the use of the eddy current principle as extended to other transducer arrangements. One such transducer is a linear variable differential transformer transducer commonly known as an LVDT or Shavits transducer. As is known, this transducer commonly utilizes the positioning of a magnetic slug to vary the output by varying the magnetic coupling between coils. In accordance with the present invention, a slug of conducting, non-magnetic material may be used to vary the relative loss in the coils and thus the transducer output as a function of the positioning of the slug.

Figure 14:
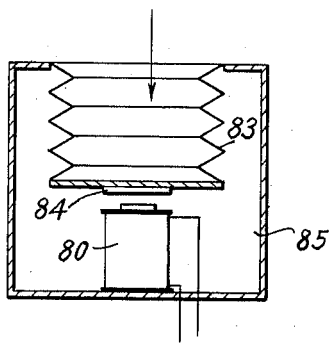

FIGURES 14 through 17 illustrate other transducer arrangements which embody the teachings of the invention. The transducer of FIGURE 14 illustrates a bellows 83 having a depending electric conducting, non-magnetic diaphragm 84. The bellows is connected to form a part of a sealed compartment 85 which encloses a coil 80. A change in the pressure differential inside the bellows and compartment 85 causes the diaphragm to move with respect to coil 80 varying the loss therein as a function of pressure.

Figure 15:
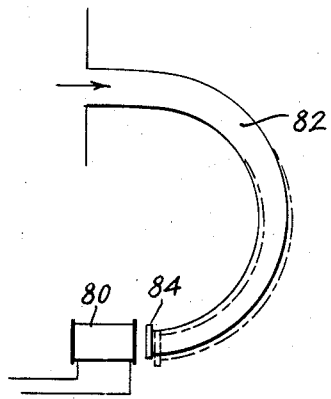

FIGURE 15 illustrates another transducer wherein the electric conducting, non-magnetic diaphragm 84 is attached to a Bourdon tube 82 which moves the diaphragm 84 with respect to coil 80 as a function of the change in pressure differential between the interior and exterior of the tube to vary the loss in the coil.

Figure 16:
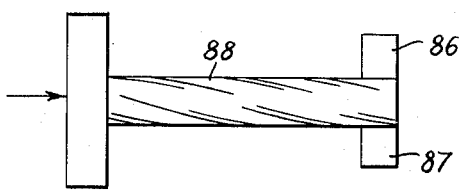
Figure 17:
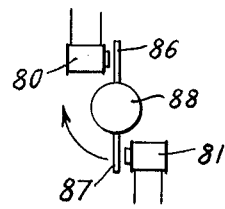

FIGURES 16 and 17 illustrate still another form of the invention in which the electric conducting, non-magnetic diaphragms 86 and 87 are attached to a torque tube 88 and are adapted to be angularly translated with respect to coils 80 and 81 as a function of the change of pressure differential between the inside and outside of tube 88. The movement of diaphragms 86 and 87 will vary the loss in coils 80 and 81. The coils 80 and 81 when connected in the bridge circuit of FIGURES 3 through 5 similarly provide an output which is a function of pressure.

It will be further appreciated that the transducer arrangement of the present invention may be utilized in other applications such as an accelerometer, force guage and the like wherein movement of the diaphragm with respect to the coil is translated to an electrical output which is a function of the relative movement and the forces applied.

While there have been described what at present are considered to be the preferred embodiments of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. A pressure sensitive transducer arrangement comprising a case of non-magnetic material having a recess therein, a coil supported on a non-magnetic, dielectric material and positioned within said recess for connection as an arm in an A.C. input bridge circuit, a flexible diaphragm of non-magnetic, electrical conducting material secured to said case and positioned over said recess to define a pressure chamber therewith, the central portion of said diaphragm being spaced from said coil to define an air gap therebetween and means to subject the diaphragm at opposite sides thereof to different pressures to cause it to flex and vary the length of the air gap to vary the effective impedance of the coil as a function of the diaphragm movement.

2. A pressure sensitive transducer arrangement comprising a hollow shell of non-magnetic material, a flexible non-magnetic, electrical conducting diaphragm secured throughout its peripheral portions to said shell and separating the hollow shell into two similar pressure chambers, a pair of coils supported on cores of a non-magnetic, dielectric material for connection in an A.C. input bridge, one coil being positioned within a chamber to each side of the diaphragm and positioned in spaced relation thereto to define an air gap with a central portion of the diaphragm and means to subject the diaphragm at opposite sides thereof to different pressures to cause it to flex and inversely vary the length of the air gaps to inversely vary the effective resistance of the coils at opposite sides of the diaphragm wherein the permeability of the diaphragm material does not substantially exceed unity, over the temperature range of use.

3. The transducer arrangement of claim 2 wherein the diaphragm is comprised of a material which has a low thermo-elastic coefficient and displays a minimum change of thermo-elastic characteristics with change in temperature, said material having a surface coating of a highly conductive non-magnetic material thereon.

4. The arrangement of claim 3 wherein the thickness of the conducting means is substantially that of the eddy current depth at the frequency of the alternating current with which it is to be used.

5. The transducer arrangement of claim 2 wherein the diaphragm is comprised of a material having a surface coating of a highly conductive non-magnetic material.

6. The arrangement of claim 2 wherein the thickness of the conducting means is substantially that of the eddy current depth at the frequency of the alternating current with which it is to be used.

References Cited by the Examiner

UNITED STATES PATENTS

| | | | |
|---|---|---|---|
| 2,581,359 | 1/1952 | Clark | 336—30 |
| 2,583,941 | 1/1952 | Gordon | 336—30 |
| 2,683,989 | 7/1954 | Clark | 336—30 X |
| 2,952,000 | 9/1960 | Wolfe | 336—30 |

JOHN F. BURNS, *Primary Examiner.*

LARAMIE E. ASKIN, *Examiner.*